(12) United States Patent
Li et al.

(10) Patent No.: US 12,118,063 B2
(45) Date of Patent: Oct. 15, 2024

(54) METHOD, APPARATUS, ELECTRONIC DEVICE AND STORAGE MEDIUM FOR TRAINING SEMANTIC SIMILARITY MODEL

(71) Applicant: BEIJING BAIDU NETCOM SCIENCE AND TECHNOLOGY CO., LTD., Beijing (CN)

(72) Inventors: Zhen Li, Beijing (CN); Yukun Li, Beijing (CN); Yu Sun, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 878 days.

(21) Appl. No.: 17/209,051

(22) Filed: Mar. 22, 2021

(65) Prior Publication Data
US 2022/0300763 A1 Sep. 22, 2022
US 2023/0004753 A9 Jan. 5, 2023

(30) Foreign Application Priority Data

May 12, 2020 (CN) .......................... 202010399048.X

(51) Int. Cl.
G06F 40/30 (2020.01)
G06F 18/214 (2023.01)
G06F 18/2413 (2023.01)

(52) U.S. Cl.
CPC .... *G06F 18/2148* (2023.01); *G06F 18/24147* (2023.01); *G06F 40/30* (2020.01)

(58) Field of Classification Search
CPC . G06F 18/2148; G06F 40/30; G06F 18/24147
See application file for complete search history.

(56) References Cited

U.S. PATENT DOCUMENTS

| 2009/0190839 A1 | 7/2009 | Higgins |
| 2012/0203539 A1 | 8/2012 | Axelrod et al. |
| 2015/0363688 A1 | 12/2015 | Gao et al. |

FOREIGN PATENT DOCUMENTS

| CN | 109543036 A | 3/2019 |
| CN | 109753566 A | 5/2019 |

(Continued)

OTHER PUBLICATIONS

Shen, Shitian, and Min Chi. "Aim Low: Correlation-Based Feature Selection for Model-Based Reinforcement Learning." International Educational Data Mining Society (2016). (Year: 2016).*

(Continued)

*Primary Examiner* — Lut Wong
(74) *Attorney, Agent, or Firm* — Kwan & Olynick LLP

(57) ABSTRACT

The present disclosure provides a method, apparatus, electronic device and storage medium for training a semantic similarity model, which relates to the field of artificial intelligence. A specific implementation solution is as follows: obtaining a target field to be used by a semantic similarity model to be trained; calculating respective correlations between the target field and application fields corresponding to each of training datasets in known multiple training datasets; training the semantic similarity model with the training datasets in turn, according to the respective correlations between the target field and the application fields corresponding to each of the training datasets. According to the technical solution of the present disclosure, it is possible to, in the fine-tuning phase, more purposefully train the semantic similarity model with the training datasets with reference to the correlations between the target field and the application fields corresponding to the training datasets, thereby effectively improving the learning capability of the sematic similarity model and effectively improving the accuracy of the trained semantic similarity model.

12 Claims, 5 Drawing Sheets

(56) References Cited

FOREIGN PATENT DOCUMENTS

| CN | 109960805 A | 7/2019 |
|----|-------------|--------|
| CN | 110991195 A | 4/2020 |
| JP | 2019125343 A | 7/2019 |

OTHER PUBLICATIONS

Ruder, Sebastian, and Barbara Plank. "Learning to select data for transfer learning with bayesian optimization." arXiv preprint arXiv: 1707.05246 (2017). (Year: 2017).*

Jiang, Lu, et al. "Self-paced curriculum learning." Proceedings of the AAAI Conference on Artificial Intelligence. vol. 29. No. 1. 2015. (Year: 2015).*

Extended European Search Report Issued in European Patent Application No. 21163971.1, Mailed Date: Aug. 5, 2021, 8 Pages.

First Office Action for JP2021-075224 issued on May 31, 2022, 2 pgs.

Notice of Allowance for CN202010399048.X issued on May 13, 2022, 3 pgs.

Rejection for CN202010399048.X issued on Jan. 24, 2022, 3 pgs.

Summons to attend oral proceedings for EP21163971.1 issued on Aug. 3, 2022, 11 pgs.

Office Action, China Patent Application No. 202010399048.X, mailed Mar. 10, 2021, 5 pages.

Search Report, Search Report, China Patent Application No. 202010399048.X, mailed Mar. 3, 2021, 2 pages.

* cited by examiner

METHOD, APPARATUS, ELECTRONIC DEVICE AND STORAGE MEDIUM FOR TRAINING SEMANTIC SIMILARITY MODEL

The present application claims the priority of Chinese Patent Application No. 202010399048.X, filed on May 12, 2020, with the title of "Method, apparatus, electronic device and storage medium for training semantic similarity model". The disclosure of the above application is incorporated herein by reference in its entirety.

FIELD OF THE DISCLOSURE

The present disclosure relates to computer technology, particularly to artificial intelligence technology, and specifically to a method, apparatus, electronic device and storage medium for training a semantic similarity model.

BACKGROUND OF THE DISCLOSURE

In the prior art, performing self-supervised pre-training learning of a language model using a lot of unsupervised texts and then performing parameter fine-tuning for the language by using supervised task data is an advanced model training technique in the current field of Natural Language Processing (NLP).

For example, a semantic matching task in the field of NLP aims to judge whether two texts are similar semantically. At present, there are few annotation data available for text matching, and the fields of the annotation data are also largely different. Therefore, in the fine-tuning phase, the current high-quality annotation data needs to be better used to fine tune a pre-trained semantic similarity model to mine the potential of the model and improve the model effect. Sets of high-quality annotation data often used in the prior art include lcqmc, bq_corpus etc. To improve the training effect, multiple types of datasets are integrated together in the prior art to train the semantic similarity model in the fine-tuning phase.

However, simply integrating multiple types of datasets to train the semantic similarity model in the fine-tuning phase in the prior art causes extremity and undesirable accuracy of the trained semantic similarity model.

SUMMARY OF THE DISCLOSURE

To address the above technical problems, the present disclosure provides a method, apparatus, electronic device and storage medium for training a semantic similarity model.

According to a first aspect of the present disclosure, there is provided a method for training a semantic similarity model, comprising:
  obtaining a target field to be used by a semantic similarity model to be trained;
  calculating respective correlations between the target field and application fields corresponding to each of training datasets in known multiple training datasets;
  training the semantic similarity model with the training datasets in turn, according to the respective correlations between the target field and the application fields corresponding to each of the training datasets.

According to a second aspect of the present disclosure, there is provided an electronic device, comprising:
  at least one processor; and
  a memory communicatively connected with the at least one processor;
  wherein the memory stores instructions executable by the at least one processor, and the instructions are executed by the at least one processor to enable the at least one processor to perform a method for training a semantic similarity model, wherein the method comprises:
  obtaining a target field to be used by a semantic similarity model to be trained;
  calculating respective correlations between the target field and application fields corresponding to each of training datasets in known multiple training datasets;
  training the semantic similarity model with the training datasets in turn, according to the respective correlations between the target field and the application fields corresponding to each of the training datasets.

According to a third aspect of the present disclosure, there is provided anon-transitory computer readable storage medium with computer instructions stored thereon, wherein the computer instructions are used for causing a computer to perform a method for training a semantic similarity model, wherein the method comprises:
  obtaining a target field to be used by a semantic similarity model to be trained;
  calculating respective correlations between the target field and application fields corresponding to each of training datasets in known multiple training datasets;
  training the semantic similarity model with the training datasets in turn, according to the respective correlations between the target field and the application fields corresponding to each of the training datasets.

According to the technology of the present application, the problem about the extremity of the semantic similarity model trained by integrating multiple types of training datasets in the prior art is solved, and it is possible to, in the fine-tuning phase, more purposefully train the semantic similarity model with the training datasets with reference to the correlations between the target field and the application fields corresponding to the training datasets, thereby effectively improving the learning capability of the sematic similarity model and effectively improving the accuracy of the trained semantic similarity model.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF DRAWINGS

The figures are intended to facilitate understanding the solutions, not to limit the present disclosure. In the figures.

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
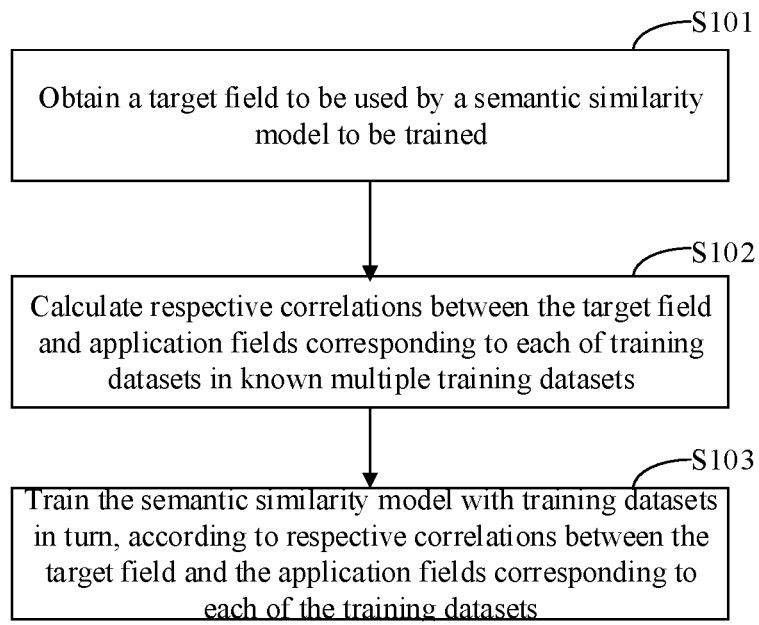
FIG. 1 illustrates a schematic diagram of a first embodiment according to the present disclosure.

FIG. 1 illustrates a schematic diagram of a first embodiment according to the present disclosure; as shown in FIG. 1, a method for training a semantic similarity model according to the present embodiment may specifically include the following steps:

S101: obtaining a target field to be used by a semantic similarity model to be trained;

S102: calculating respective correlations between the target field and application fields corresponding to each of training datasets in known multiple training datasets;

S103: training the semantic similarity model with the training datasets in turn, according to the respective correlations between the target field and the application fields corresponding to each of the training datasets.

A subject for executing the method for training a semantic similarity model according to the present embodiment is an apparatus for training the semantic similarity model. The apparatus may be an electronic entity similar to a computer, or may be an application integrated with software, the application, upon use, running on the computer device to train the semantic similarity model.

The method of training the sematic similarity model according to the present embodiment is applied in the training in the parameter fine-tuning phase. In a semantic matching task of the NLP field, a preliminary structure of the semantic similarity model is already obtained in the pre-training phase. Then, in the fine-turning phase, parameter fine-tuning may be performed for the pre-trained semantic similarity model using corresponding high-quality task datasets. However, there are less training datasets in the current fine-tuning phase, for example, a lcqmc dataset constituted by similarity data in the field of Baidu Know-how, a bq_corpus dataset constituted by similarity data in the banking and financial field, etc. likewise, it is further possible to mine to get datasets constituted by similarity data in other fields such as E-commerce, medical care, education, economy, sports and music. However, in the solution in the prior art, these datasets are directly integrated together to train the pre-trained semantic similarity model, which causes a poor accuracy of the trained sematic similarity model.

In the present embodiment, to improve the accuracy of the semantic similarity model, the fine-tuning in the fine-tuning phase needs to be performed with reference to the target field to be used by the semantic similarity model. Specifically, the target field to be used by the semantic similarity model to be trained is obtained first. In the present embodiment, the semantic similarity model may be preset to correspond to fields. A plurality of fields may be set according to actual needs. In addition, in the present embodiment, known training datasets and application fields corresponding to the training datasets need to be acquired, for example, the lcqmc dataset in the field of Baidu Know-know serves as a training dataset, and the bq_corpus dataset in the banking and financial field may also serve as a training dataset, etc. Then, correlations between the target field and the application fields corresponding to the known training datasets are calculated.

It needs to be appreciated that the correlations here may be calculated based on the semantic similarity between the target field and the application fields corresponding to the training datasets. For example, specifically a duly-trained word vector model may be used to obtain a word vector of the target field and word vectors of the application fields corresponding to the training datasets, and then the correlations between the target field and the application fields corresponding to the training datasets may be obtained by calculating a similarity between word vectors. For example, the word vector model here may be implemented using a duy-trained Word2vec model.

Finally, the semantic similarity model is trained with the training datasets in turn with reference to the correlations between the target field and the application fields corresponding to the known training datasets, to improve the accuracy of the semantic similarity model.

According to the method of training the semantic similarity model of the present embodiment, the target field to be used by a semantic similarity model to be trained is obtained; the correlations between the target field and application fields corresponding to training datasets in known multiple training datasets are calculated; the semantic similarity model is trained with the training datasets in turn, according to the correlations between the target field and the application fields corresponding to the training datasets. According to the technical solution of the present embodiment, it is possible to, in the fine-tuning phase, more purposefully train the semantic similarity model with the training datasets with reference to the correlations between the target field and the application fields corresponding to the training datasets, thereby overcoming the problem about the extremity of the semantic similarity model trained by integrating multiple types of training datasets in the prior art, effectively improving the learning capability of the sematic similarity model and effectively improving the accuracy of the trained semantic similarity model.

Figure 2:
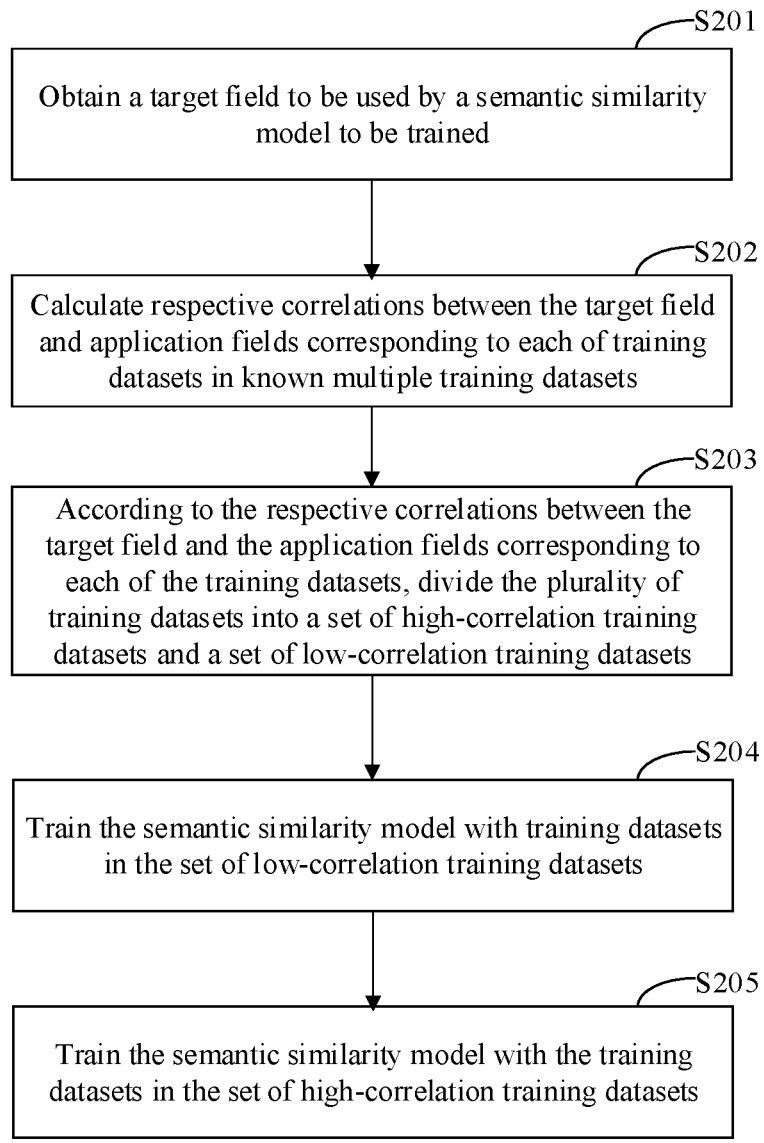
FIG. 2 illustrates a schematic diagram of a second embodiment according to the present disclosure.

FIG. 2 illustrates a schematic diagram of a second embodiment according to the present disclosure. As shown in FIG. 2, the technical solution of the method for training the semantic similarity model according to the present embodiment will be further introduced in more detail on the basis of the above technical solution of the embodiment shown in FIG. 1. As shown in FIG. 2, the method for training the semantic similarity model according to the present embodiment may specifically include the following steps:

S201: obtaining a target field to be used by a semantic similarity model to be trained;

S202: calculating respective correlations between the target field and application fields corresponding to each of training datasets;

Steps S201 and S202 are the same as steps S101 and S102 in the embodiment shown in FIG. 1, respectively. For details, reference may be made to relevant depictions of the embodiment shown in FIG. 1. Detailed depictions will not be presented any more here.

S203: according to the respective correlations between the target field and the application fields corresponding to each of the training datasets, dividing a plurality of training datasets into a set of high-correlation training datasets and a set of low-correlation training datasets;

In the present embodiment, an example is taken in which a plurality of training datasets are divided into a set of high-correlation training datasets and a set of low-correlation training datasets. For example, upon dividing, training datasets of N application fields with the highest correlation with the target field may be directed to the set of high-correlation training datasets; other training datasets may be directed to the set of low-correlation training datasets. The value of N may be determined according to actual experience, for example, 1 may be taken as the value of N. At this time, the set of the high-correlation training datasets only include one training dataset, namely, a training dataset corresponding to the application field with the highest correlation with the target field, among the plurality of training datasets. Other training datasets among the plurality of training datasets are directed to the set of low-correlation training datasets. N may also take other values such as 2 or 3 according to actual experience.

Optionally, the above dividing is exemplified as dividing the plurality of training datasets into two sets of training datasets. In practical application, if there are more training datasets, the plurality of training datasets may be divided into three or more sets of training datasets according actual needs. The correlations between application fields of the training datasets in each set of training dataset and the target field are close. For example, an example is taken in which the training datasets are divided into three sets of training datasets. Two correlation thresholds, namely, a first correlation threshold and a second correlation threshold, may be set, with the first correlation threshold being greater than the second correlation threshold. Upon dividing, the training datasets corresponding to the application fields with the correlation with the target field being greater than or equal to the first correlation threshold may be directed into a first-grade set of training datasets; the training datasets corresponding to the application fields with the correlation with the target field being greater than or equal to the second correlation threshold and smaller than the first correlation threshold may be directed into a second-grade set of training datasets; the training datasets corresponding to the application fields with the correlation with the target field being smaller than the second correlation threshold may be directed into a third-grade set of training datasets. Likewise, multi-grade sets of training datasets may also be provided according to actual needs, which will not be detailed any more here.

S204: training the semantic similarity model with training datasets in the set of low-correlation training datasets;

Optionally, when the step is implemented, any of the following manners may be employed for implementation:

(1) training the semantic similarity model respectively with the corresponding training datasets in turn in an ascending order of correlations between the target field and the application fields corresponding to training datasets in the set of low-correlation training datasets; or (2) randomly ranking the training datasets in the set of low-correlation training datasets, and training the semantic similarity model with the corresponding training datasets in turn in the random ranking order.

The semantic similarity model may be trained in any of the above manners with the training datasets in the set of low-correlation training datasets. Since the semantic similarity model is trained with the set of low-correlation training datasets before with the set of high-correlation training datasets, and the training datasets in the set of low-correlation training datasets exerts a small impact on the semantic similarity model, the above manner (2) randomly ranking the training datasets in the set of low-correlation training datasets and training the semantic similarity model with the corresponding training datasets in turn in the random ranking order may be employed.

However, preferably, the correlations between the application fields corresponding to the training datasets in the set of low-correlation training datasets and the target field are at different levels, the above manner (1) training the semantic similarity model respectively with the corresponding training datasets in turn in an ascending order of correlations between the target field and the application fields corresponding to training datasets in the set of low-correlation training datasets may be employed so that the semantic similarity model gradually learns information in the training datasets of the application fields more related to the target field, thereby making the expression thereof in the target field more accurate.

S205: training the semantic similarity model with the training datasets in the set of high-correlation training datasets.

Optionally, if N=1 when the set of high-correlation training datasets is obtained by dividing, the semantic similarity model is trained directly with the training datasets in the set of high-correlation training datasets. If N>1, the semantic similarity model is trained respectively with the corresponding training datasets in turn in an ascending order of correlations between the target field and the application fields corresponding to training datasets in the set of high-correlation training datasets, so that the semantic similarity model gradually learns information in the training datasets of the application fields more related to the target field, thereby making the expression thereof in the target field more accurate.

According to the above technical solution of the present embodiment, the set of low-correlation training datasets and the set of high-correlation training datasets are divided, the semantic similarity model is trained first with the training datasets in the set of low-correlation training datasets, and the semantic similarity model is trained first with the training datasets in the set of high-correlation training datasets. In this way, the semantic similarity model first learns the information of low-correlation training datasets, and then learns the information of high-correlation training datasets so that the accuracy of the semantic similarity model in the target field is made higher.

In addition, optionally, in the above manner stated above, if there are multiple grades of sets of training datasets with the correlation, the semantic similarity model is trained first with the training datasets in the set of low-correlation training datasets in turn in an ascending order of correlations between the training datasets in multi-grade sets of training datasets, and then the semantic similarity model is trained with the training datasets in the set of high-correlation training datasets, so that when the semantic similarity model of the target field is trained, a gradual learning process in an ascending order of correlations is performed. This is a better learning process, so that the learning effect of the semantic similarity model is made better, and the expression of the semantic similarity model of the target field obtained from the learning is more accurate.

According to the above technical solution of the method of training the semantic similarity model in the present embodiment, the plurality of training datasets may be divided into the set of high-correlation training datasets and the set of low-correlation training datasets, and then the semantic similarity model is trained in turn with the training datasets in the set of low-correlation training datasets and the set of high-correlation training datasets, so that the semantic similarity model gradually learns information in the training datasets with a higher correlation with the target field, thereby making the accuracy of the semantic similarity model in the target field higher. Hence, the technical solution of the present embodiment can effectively improve the accuracy of the trained semantic similarity model.

Figure 3:
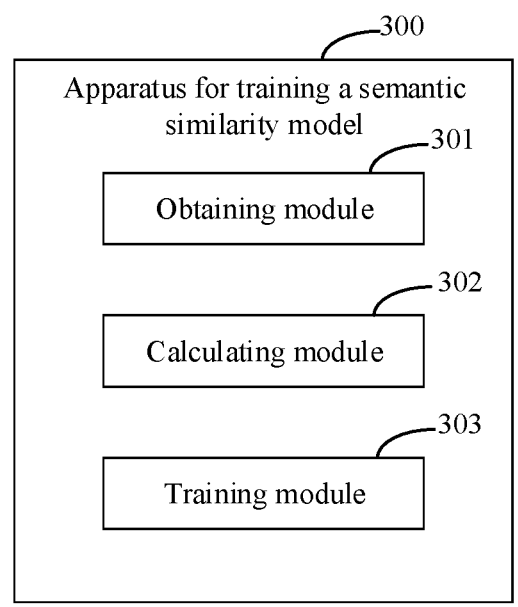
FIG. 3 illustrates a schematic diagram of a third embodiment according to the present disclosure.

FIG. 3 illustrates a schematic diagram of a third embodiment according to the present disclosure. As shown in FIG. 3, the present embodiment provides an apparatus 300 for training a semantic similarity model, comprising:

an obtaining module 301 configured to obtain a target field to be used by a semantic similarity model to be trained;

a calculating module 302 configured to calculate respective correlations between the target field and application fields corresponding to each of training datasets in known multiple training datasets;

a training module 303 configured to train the semantic similarity model with the training datasets in turn, according to the respective correlations between the target field and the application fields corresponding to each of the training datasets.

Principles employed by the apparatus 300 for training the semantic similarity model of the present embodiment to implement the training of the semantic similarity model by using the above modules and the resultant technical effects are the same as those of the above relevant method embodiments. For particulars, please refer to the depictions of the aforesaid relevant method embodiments, and no detailed depictions will be presented here.

Figure 4:
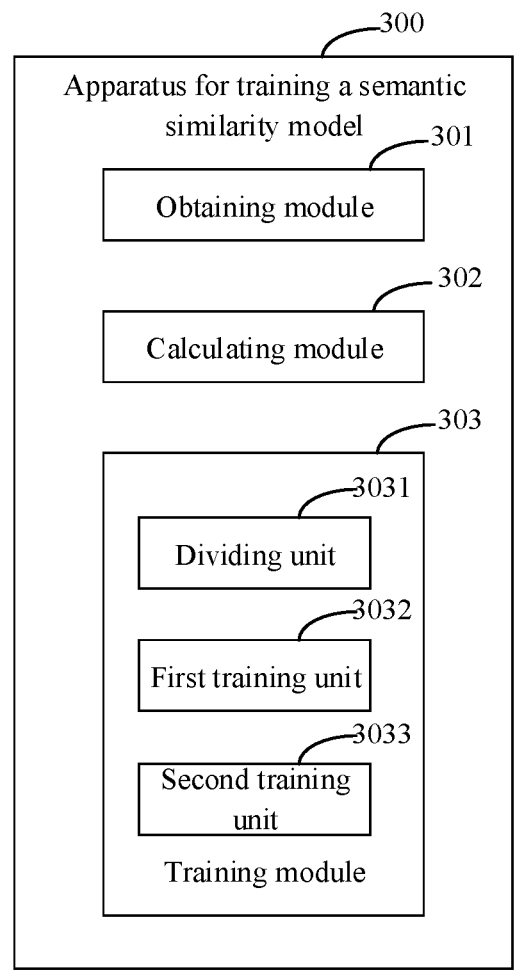
FIG. 4 illustrates a schematic diagram of a fourth embodiment according to the present disclosure.

FIG. 4 illustrates a schematic diagram of a fourth embodiment according to the present disclosure. As shown in FIG. 4, the apparatus 300 for training the semantic similarity model of the present embodiment will be further described in more detail on the basis of the technical solution of the embodiment shown in FIG. 3.

As shown in FIG. 4, in the apparatus 300 for training the semantic similarity model of the present embodiment, the training module 303 comprises:

a dividing unit 3031 configured to, according to the respective correlations between the target field and the application fields corresponding to each of the training datasets, divide a plurality of training datasets into a set of high-correlation training datasets and a set of low-correlation training datasets;

a first training unit 3032 configured to train the semantic similarity model in turn with training datasets in the set of low-correlation training datasets;

a second training unit 3033 configured to train the semantic similarity model in turn with the training datasets in the set of high-correlation training datasets.

Further optionally, the first training unit 3032 is configured to:

train the semantic similarity model respectively with the corresponding training datasets in turn in an ascending order of correlations between the target field and the application fields corresponding to training datasets in the set of low-correlation training datasets; or randomly rank the training datasets in the set of low-correlation training datasets, and train the semantic similarity model with the corresponding training datasets in turn in the random ranking order.

Further optionally, the dividing unit 3031 is configured to:

direct training datasets of N application fields with the highest correlation with the target field to the set of high-correlation training datasets;

direct other training datasets to the set of low-correlation training datasets.

Further optionally, the second training unit 3033 is configured to:

if N>1, train the semantic similarity model respectively with the corresponding training datasets in turn in an ascending order of correlations between the target field and the application fields corresponding to training datasets in the set of high-correlation training datasets.

Principles employed by the apparatus 300 for training the semantic similarity model of the present embodiment to implement the training of the semantic similarity model by using the above modules and the resultant technical effects are the same as those of the above relevant method embodiments. For particulars, please refer to the depictions of the aforesaid relevant method embodiments, and no detailed depictions will be presented here.

According to embodiments of the present disclosure, the present disclosure further provides an electronic device and a readable storage medium.

Figure 5:
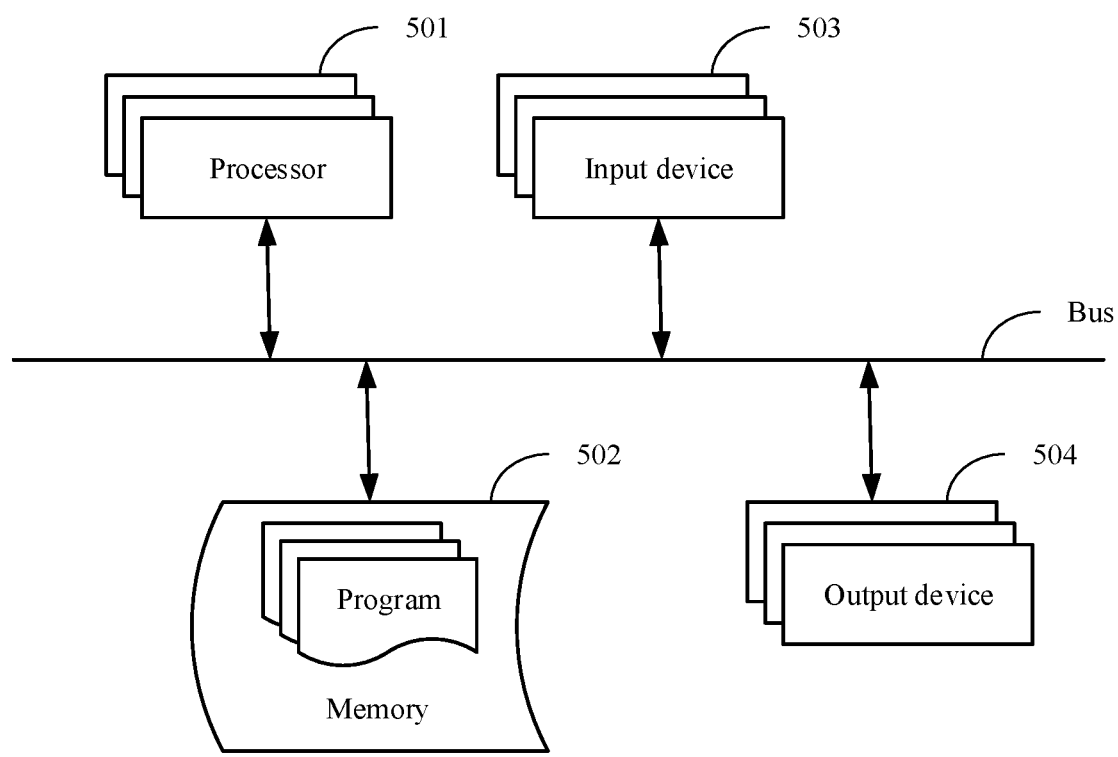
FIG. 5 illustrates a block diagram of an electronic device for implementing a method for training a semantic similarity model according to embodiments of the present disclosure.

As shown in FIG. 5, it shows a block diagram of an electronic device for implementing the method for training the semantic similarity model according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 5, the electronic device comprises: one or more processors 501, a memory 502, and interfaces configured to connect components and including a high-speed interface and a low speed interface. Each of the components are interconnected using various busses, and may be mounted on a common motherboard or in other manners as appropriate. The processor can process instructions for execution within the electronic device, including instructions stored in or on the memory to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 501 is taken as an example in FIG. 5.

The memory 502 is a non-transitory computer-readable storage medium provided by the present disclosure. The memory stores instructions executable by at least one processor, so that the at least one processor executes the method for training the semantic similarity model according to the present disclosure. The non-transitory computer-readable storage medium of the present disclosure stores computer instructions, which are used to cause a computer to execute the method for training the semantic similarity model according to the present disclosure.

The memory 502 is a non-transitory computer-readable storage medium and can be used to store non-transitory software programs, non-transitory computer executable programs and modules, such as program instructions/modules (e.g., relevant modules shown in FIG. 3 through FIG. 4) corresponding to the method for training the semantic similarity model in embodiments of the present disclosure. The processor 501 executes various functional applications and data processing of the server, i.e., implements the method for training the semantic similarity model in the above method embodiments, by running the non-transitory software programs, instructions and modules stored in the memory 502.

The memory 502 may include a storage program region and a storage data region, wherein the storage program region may store an operating system and an application program needed by at least one function; the storage data region may store data created by the use of the electronic device for implementing the method for training the semantic similarity model. In addition, the memory 502 may include a high-speed random access memory, and may also include a non-transitory memory, such as at least one magnetic disk storage device, a flash memory device, or other non-transitory solid-state storage device. In some embodiments, the memory 502 may optionally include a memory remotely arranged relative to the processor 501, and these remote memories may be connected to the electronic device for implementing the method for training the semantic similarity model through a network. Examples of the above network include, but are not limited to, the Internet, an intranet, a local area network, a mobile communication network, and combinations thereof.

The electronic device for implementing the method for training the semantic similarity model may further include an input device 503 and an output device 504. The processor 501, the memory 502, the input device 503 and the output device 504 may be connected through a bus or in other manners. In FIG. 5, the connection through the bus is taken as an example.

The input device 503 may receive inputted numeric or character information and generate key signal inputs related to user settings and function control of the electronic device for implementing the method for training the semantic similarity model, and may be an input device such as a touch screen, keypad, mouse, trackpad, touchpad, pointing stick, one or more mouse buttons, trackball and joystick. The output device 504 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a proxies component (e.g., an application server), or that includes a front end component (e.g., a client computer having a graphical user interface or a Web browser through which a user may interact with an implementation of the systems and techniques described here), or any combination of such back end, proxies, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

According to the technical solutions of embodiments of the present disclosure, the target field to be used by the semantic similarity model to be trained is obtained; the correlations between the target field and application fields corresponding to training datasets in known multiple training datasets are calculated; the semantic similarity model is trained with the training datasets in turn, according to the correlations between the target field and the application fields corresponding to the training datasets. According to the technical solution of the present embodiment, it is possible to, in the fine-tuning phase, more purposefully train the semantic similarity model with the training datasets with reference to the correlations between the target field and the application fields corresponding to the training datasets, thereby overcoming the problem about the extremity of the semantic similarity model trained by integrating multiple types of training datasets in the prior art and effectively improving the accuracy of the trained semantic similarity model.

According to the technical solutions of embodiments of the present disclosure, the plurality of training datasets may be divided into the set of high-correlation training datasets and the set of low-correlation training datasets, and then the semantic similarity model is trained in turn with the training datasets in the set of low-correlation training datasets and the set of high-correlation training datasets, so that the semantic similarity model gradually learns information in the training datasets with a higher correlation with the target field, thereby making the accuracy of the semantic similarity model in the target field higher. Hence, the technical solution of the present embodiment can effectively improve the accuracy of the trained semantic similarity model.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A computer-implemented method for training a semantic similarity model for a parameter fine-tuning of a semantic matching task of Natural Language Processing (NLP), the semantic similarity model being configured to receive an input of two texts, calculate the similarity between the two texts, and output a semantic similarity, wherein the method comprises:
   obtaining a target field to be used by a semantic similarity model to be trained;
   calculating respective correlations between the target field and application fields corresponding to each of training datasets in known multiple training datasets;
   training the semantic similarity model with the training datasets in turn, according to an ascending order of the respective correlations between the target field and the application fields corresponding to each of the training datasets,
   wherein the training the semantic similarity model with the training datasets in turn, according to an ascending order of the respective correlations between the target field and the application fields corresponding to each of the training datasets comprises:
   according to the respective correlations between the target field and the application fields corresponding to each of the training datasets, dividing the plurality of training datasets into a set of high-correlation training datasets and a set of low-correlation training datasets;
   training the semantic similarity model in turn with training datasets in the set of low-correlation training datasets;
   training the semantic similarity model in turn with the training datasets in the set of high-correlation training datasets.

2. The method according to claim 1, wherein the training the semantic similarity model in turn with training datasets in the set of low-correlation training datasets comprises:
   training the semantic similarity model respectively with the corresponding training datasets in turn in an ascending order of correlations between the target field and the application fields corresponding to training datasets in the set of low-correlation training datasets; or
   randomly ranking the training datasets in the set of low-correlation training datasets; training the semantic similarity model with the corresponding training datasets in turn in the random ranking order.

3. The method according to claim 1, wherein the step of, according to the correlations between the target field and the application fields corresponding to the training datasets, dividing the plurality of training datasets into a set of high-correlation training datasets and a set of low-correlation training datasets comprises:
   directing the training datasets of N application fields with the highest correlation with the target field to the set of high-correlation training datasets;
   directing other training datasets to the set of low-correlation training datasets.

4. The method according to claim 3, wherein the training the semantic similarity model in turn with the training datasets in the set of high-correlation training datasets comprises:
   if N>1, training the semantic similarity model respectively with the corresponding training datasets in turn in an ascending order of correlations between the target field and the application fields corresponding to training datasets in the set of high-correlation training datasets.

5. An electronic device, comprising:
   at least one processor; and
   a memory communicatively connected with the at least one processor;
   wherein the memory stores instructions executable by the at least one processor, and the instructions are executed by the at least one processor to enable the at least one processor to perform a method for training a semantic similarity model for a parameter fine-tuning of a semantic matching task of Natural Language Processing (NLP), the semantic similarity model being configured to receive an input of two texts, calculate the similarity between the two texts, and output a semantic similarity, wherein the method comprises:
   obtaining a target field to be used by a semantic similarity model to be trained;
   calculating respective correlations between the target field and application fields corresponding to each of training datasets in known multiple training datasets;
   training the semantic similarity model with the training datasets in turn, according to an ascending order of the respective correlations between the target field and the application fields corresponding to each of the training datasets,
   wherein the training the semantic similarity model with the training datasets in turn, according to an ascending order of the respective correlations between the target field and the application fields corresponding to each of the training datasets comprises:
   according to the respective correlations between the target field and the application fields corresponding to each of the training datasets, dividing the plurality of training datasets into a set of high-correlation training datasets and a set of low-correlation training datasets;
   training the semantic similarity model in turn with training datasets in the set of low-correlation training datasets;
   training the semantic similarity model in turn with the training datasets in the set of high-correlation training datasets.

6. The electronic device according to claim 5, wherein the training the semantic similarity model in turn with training datasets in the set of low-correlation training datasets comprises:

training the semantic similarity model respectively with the corresponding training datasets in turn in an ascending order of correlations between the target field and the application fields corresponding to training datasets in the set of low-correlation training datasets; or randomly ranking the training datasets in the set of low-correlation training datasets, and training the semantic similarity model with the corresponding training datasets in turn in the random ranking order.

7. The electronic device according to claim 5, wherein the step of, according to the correlations between the target field and the application fields corresponding to the training datasets, dividing the plurality of training datasets into a set of high-correlation training datasets and a set of low-correlation training datasets comprises:

directing the training datasets of N application fields with the highest correlation with the target field to the set of high-correlation training datasets;

directing other training datasets to the set of low-correlation training datasets.

8. The electronic device according to claim 7, wherein the training the semantic similarity model in turn with the training datasets in the set of high-correlation training datasets comprises:

if $N>1$, training the semantic similarity model respectively with the corresponding training datasets in turn in an ascending order of correlations between the target field and the application fields corresponding to training datasets in the set of high-correlation training datasets.

9. A non-transitory computer readable storage medium with computer instructions stored thereon, wherein the computer instructions are used for causing a computer to perform a method for training a semantic similarity model for a parameter fine-tuning of a semantic matching task of Natural Language Processing (NLP), the semantic similarity model being configured to receive an input of two texts, calculate the similarity between the two texts, and output a semantic similarity, wherein the method comprises:

obtaining a target field to be used by a semantic similarity model to be trained;

calculating respective correlations between the target field and application fields corresponding to each of training datasets in known multiple training datasets;

training the semantic similarity model with the training datasets in turn, according to an ascending order of the respective correlations between the target field and the application fields corresponding to each of the training datasets, wherein the training the semantic similarity model with the training datasets in turn, according to an ascending order of the respective correlations between the target field and the application fields corresponding to each of the training datasets comprises:

according to the respective correlations between the target field and the application fields corresponding to each of the training datasets, dividing the plurality of training datasets into a set of high-correlation training datasets and a set of low-correlation training datasets;

training the semantic similarity model in turn with training datasets in the set of low-correlation training datasets;

training the semantic similarity model in turn with the training datasets in the set of high-correlation training datasets.

10. The non-transitory computer readable storage medium according to claim 9, wherein the training the semantic similarity model in turn with training datasets in the set of low-correlation training datasets comprises:

training the semantic similarity model respectively with the corresponding training datasets in turn in an ascending order of correlations between the target field and the application fields corresponding to training datasets in the set of low-correlation training datasets; or randomly ranking the training datasets in the set of low-correlation training datasets; training the semantic similarity model with the corresponding training datasets in turn in the random ranking order.

11. The non-transitory computer readable storage medium according to claim 9, wherein the step of, according to the correlations between the target field and the application fields corresponding to the training datasets, dividing the plurality of training datasets into a set of high-correlation training datasets and a set of low-correlation training datasets comprises:

directing the training datasets of N application fields with the highest correlation with the target field to the set of high-correlation training datasets;

directing other training datasets to the set of low-correlation training datasets.

12. The non-transitory computer readable storage medium according to claim 11, wherein the training the semantic similarity model in turn with the training datasets in the set of high-correlation training datasets comprises:

if $N>1$, training the semantic similarity model respectively with the corresponding training datasets in turn in an ascending order of correlations between the target field and the application fields corresponding to training datasets in the set of high-correlation training datasets.

\* \* \* \* \*